US012654234B2

(12) United States Patent
Sasaki

(10) Patent No.: US 12,654,234 B2
(45) Date of Patent: Jun. 16, 2026

(54) CHUCK APPARATUS

(71) Applicant: SMC CORPORATION, Tokyo (JP)

(72) Inventor: Tsuyoshi Sasaki, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 656 days.

(21) Appl. No.: 17/579,658

(22) Filed: Jan. 20, 2022

(65) Prior Publication Data

US 2022/0241871 A1 Aug. 4, 2022

(30) Foreign Application Priority Data

Feb. 3, 2021 (JP) .................................. 2021-015638

(51) Int. Cl.
| | |
|---|---|
| *B23B 31/175* | (2006.01) |
| *B25J 15/02* | (2006.01) |
| *B25J 15/04* | (2006.01) |
| *B25J 15/08* | (2006.01) |

(52) U.S. Cl.
CPC ..... *B23B 31/16216* (2013.01); *B25J 15/0266* (2013.01); *B25J 15/0408* (2013.01); *B25J 15/086* (2013.01); *B25J 15/0273* (2013.01); *Y10T 279/1961* (2015.01)

(58) Field of Classification Search
CPC ........ B23B 31/16216; B23B 31/16195; B23B 31/162; B23B 31/16208; B25J 15/086; B25J 15/0408; Y10T 279/1961; Y10T 279/1593
See application file for complete search history.

(56) References Cited

U.S. PATENT DOCUMENTS

| | | | |
|---|---|---|---|
| 2009/0127879 A1 | 5/2009 | Maffeis | |
| 2017/0001245 A1 | 1/2017 | Hara et al. | |
| 2020/0276718 A1* | 9/2020 | Bellandi | ................ B25J 15/028 |

FOREIGN PATENT DOCUMENTS

| | | | |
|---|---|---|---|
| CN | 101801822 A | 8/2010 | |
| EP | 2674264 A2 * | 12/2013 | .............. B25J 15/04 |
| JP | 2002-233985 A | 8/2002 | |
| JP | 2017-013161 A | 1/2017 | |

OTHER PUBLICATIONS

Extended European Search Report issued Jul. 4, 2022, in corresponding European Patent Application No. 22153576.8, 7 pages.
Chinese Office Action issued Jul. 15, 2025, in corresponding Chinese Patent Application No. 202210112061.1, filed Jan. 29, 2022, 15 pages.

* cited by examiner

*Primary Examiner* — Sunil K Singh
*Assistant Examiner* — Eric Daniel Whitmire
(74) *Attorney, Agent, or Firm* — Oblon, McClelland, Maier & Neustadt, L.L.P.

(57) ABSTRACT

A chuck apparatus includes a pair of grip members driven by a piston via a pair of levers, and the levers are rotatably supported by a body via lever shafts. A lever shaft protrudes from the attachment surface of the body to the transport device, and positioning with respect to the transport device is performed by using the protruding portion.

5 Claims, 6 Drawing Sheets

10

26
14
18
12
32a
34
36
64
32b
32
20
16
30
28a
28
28b
38
42a
44
42
46
58
50
42b
40c
52
40a
40
40b
40d
60
66
W
X

CHUCK APPARATUS

CROSS-REFERENCE TO RELATED APPLICATIONS

This application is based upon and claims the benefit of priority from Japanese Patent Application No. 2021-015638 filed on Feb. 3, 2021, the contents of which are incorporated herein by reference.

BACKGROUND OF THE INVENTION

Field of the Invention

The present invention relates to a chuck apparatus comprising a pair of gripping members driven by an air cylinder.

Description of the Related Art

Conventionally, a chuck apparatus for gripping a workpiece with a grip member capable of opening and closing has been known. For example, JP 2017-013161 A discloses a chuck apparatus provided with a pair of grip members linked to a piston of an air cylinder via a lever.

Such a chuck apparatus is generally used by attaching the side face of an air cylinder to a transport device. In this case, in order to grip the workpiece at an appropriate position and in an appropriate posture, it is necessary to set the position of the grip members with respect to the transport device with high accuracy.

However, it is not easy to improve the accuracy of the position of the grip members with respect to the transport device because many components are interposed between the grip members and the transport device and thus machining tolerances of the components are accumulated.

JP 2002-233985 A discloses a method for assembling a grip device having a pair of master jaws that can be opened and closed. In this assembling method, the grip device is assembled such that the center of an end boss attached to the bottom of the grip device and the opening/closing center of the master jaws are aligned with each other and the grip device is perpendicular to an end boss attachment surface. However, a special jig is required for assembly.

SUMMARY OF THE INVENTION

In view of the above, it is desired that a special jig is not required, the accuracy of the position of the grip members with respect to the transport device can be increased, and the workpiece can be gripped at an accurate position and in an appropriate posture.

The present invention has the object of solving the aforementioned problems.

One aspect of the present invention is a chuck apparatus provided with a pair of grip members driven by a piston through a pair of levers, the chuck apparatus being used by attaching a body to a transport device, wherein the lever is rotatably supported by the body via a lever shaft, and the lever shaft protrudes from a mounting surface of the body mounted to the transport device, and positioning with respect to the transport device is performed by using the protruding end portion.

According to the above-described chuck apparatus, positioning with respect to the transport device is performed by using the projecting end portion of the lever shaft. Therefore, the accuracy of the positions of the grip members with respect to the transport device can be increased, and the workpiece can be gripped at an accurate position and in an accurate posture.

According to the chuck apparatus of the present invention, a lever shaft, which is a rotating shaft of a lever for opening and closing a grip member, protrudes from a surface on which a body is attached to a transport device, and positioning with respect to the transport device is performed using the protruding portion. Therefore, it is possible to increase the accuracy of the positions of the grip members with respect to the transport device.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 1:
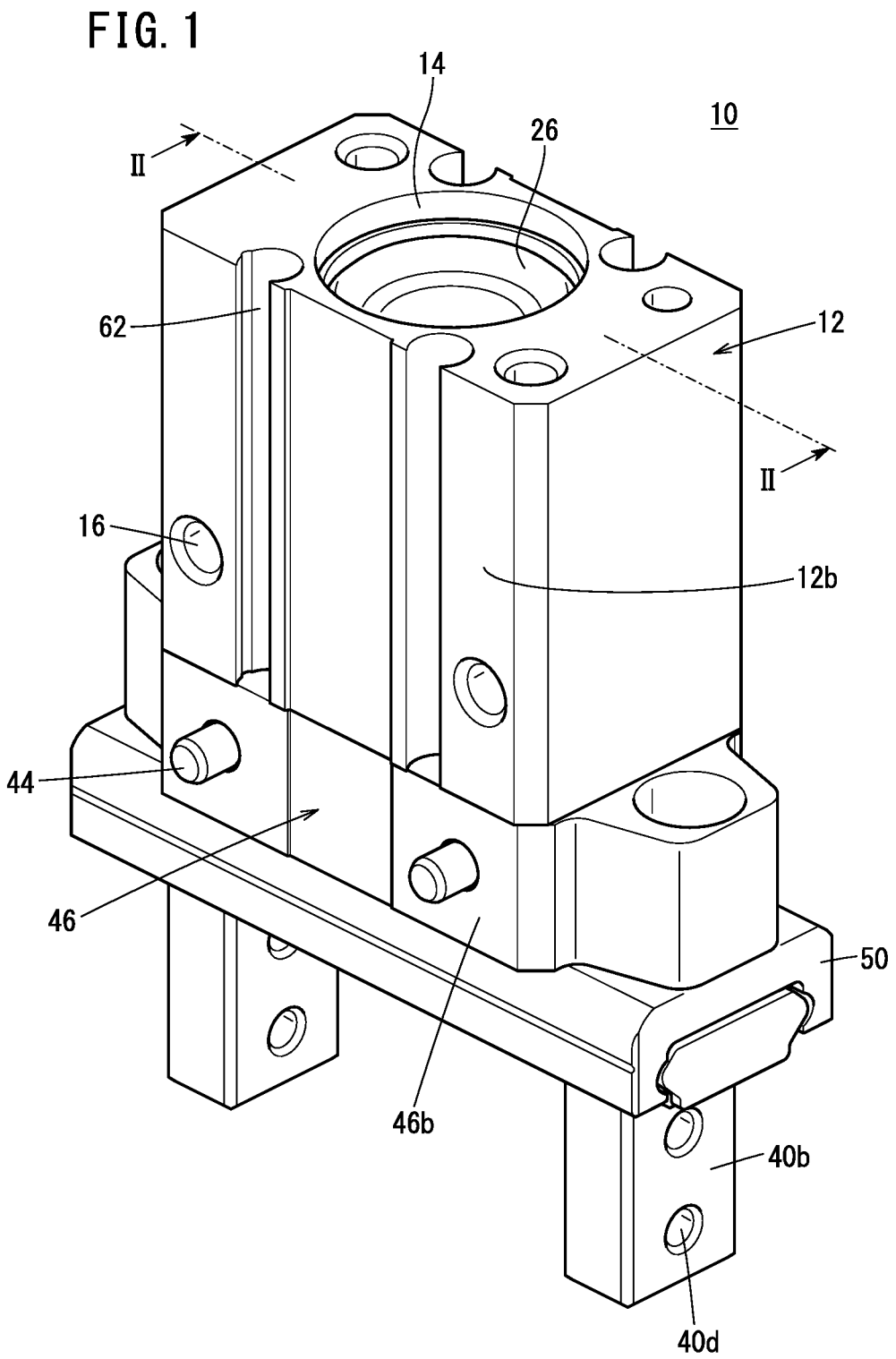
FIG. 1 is an external perspective view of a chuck apparatus according to a first embodiment of the present invention.
Figure 2:
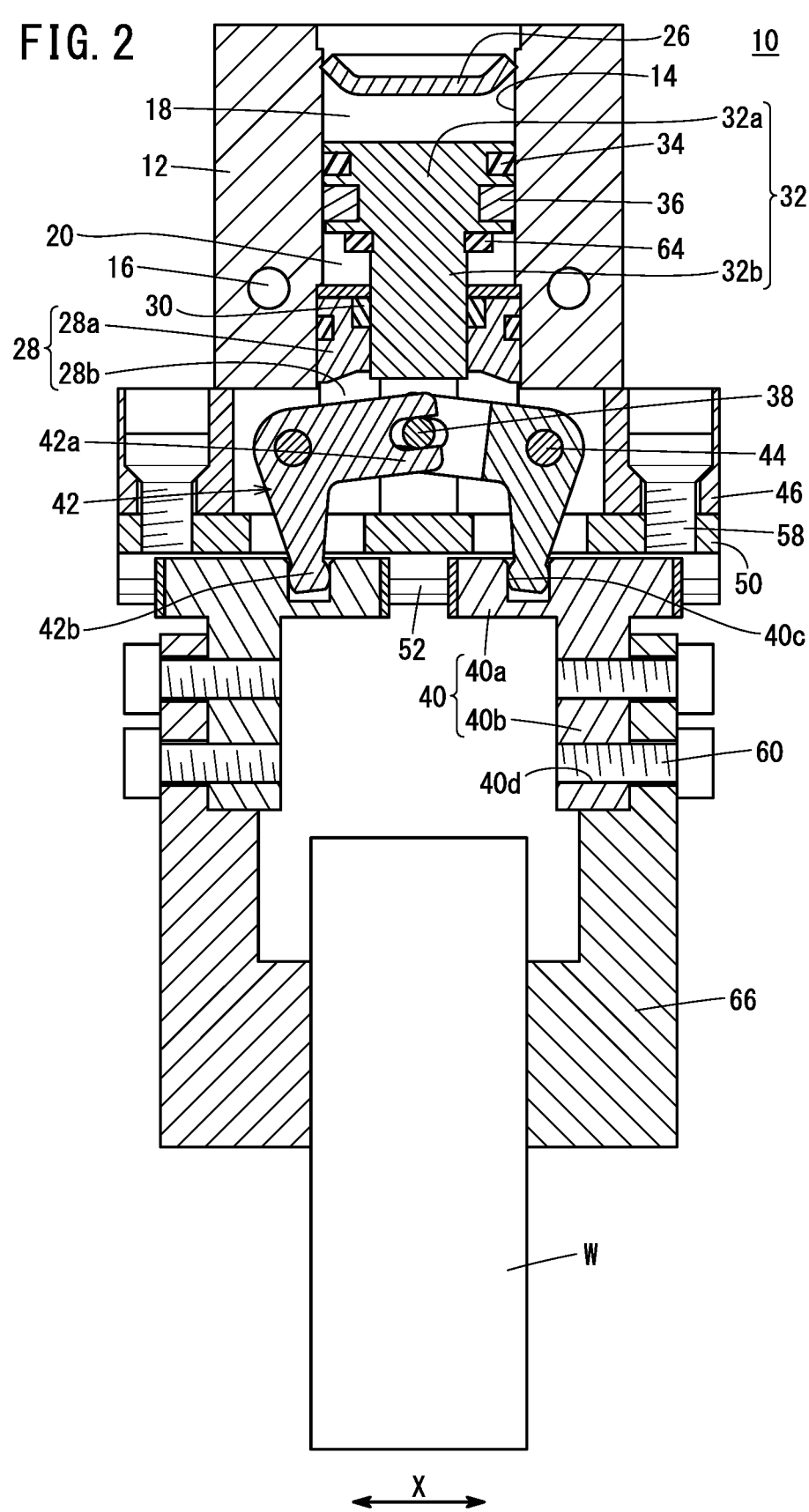
FIG. 2 is a cross-sectional view taken along a line II-II of the chuck apparatus of FIG. 1, being shown together with an attachment.
Figure 3:
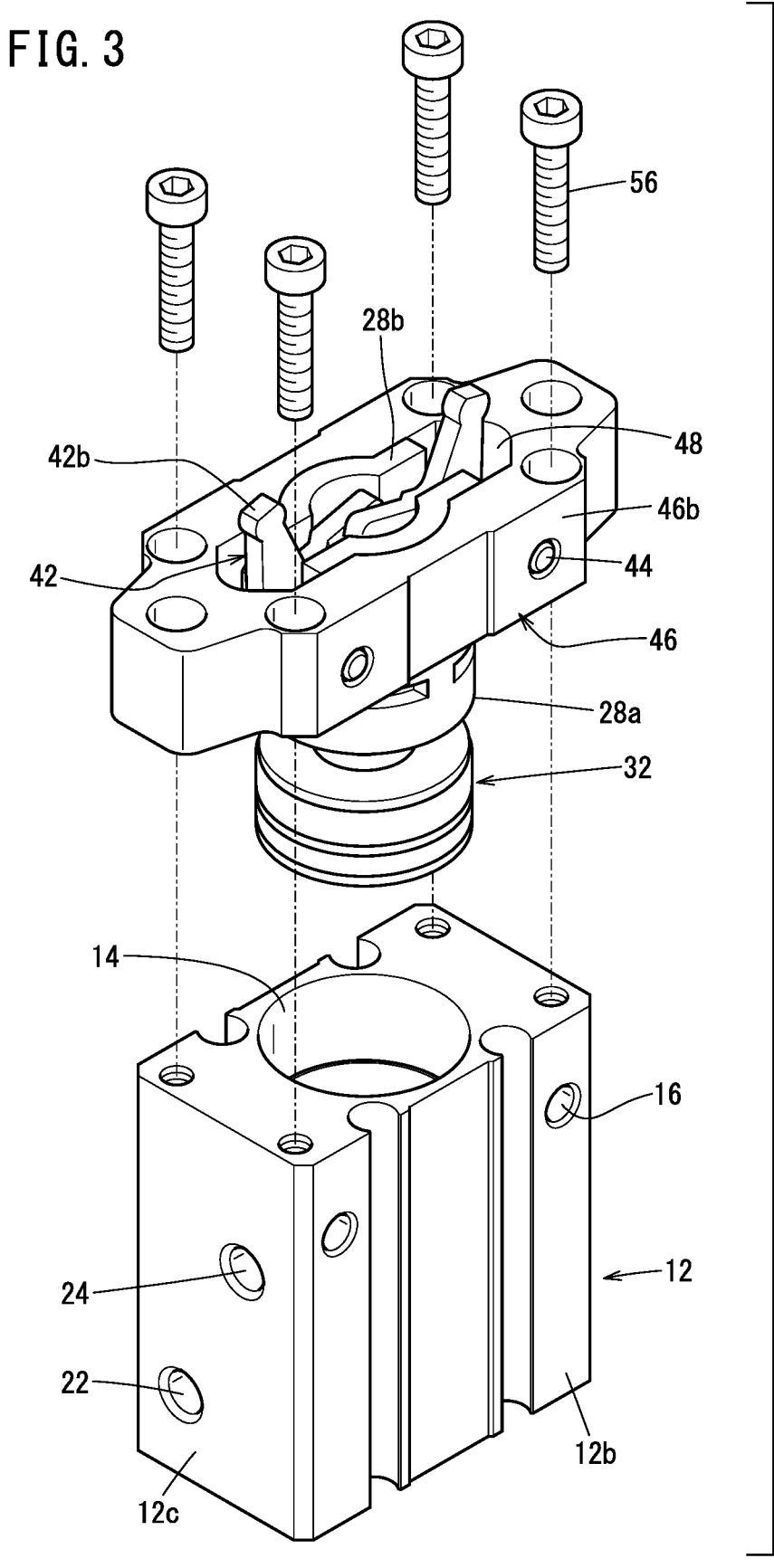
FIG. 3 is a view in which a part of the chuck apparatus of FIG. 1 is expanded into parts or a group of parts.

In the following description, when the terms in relation to the up and down directions are used, they refer to directions on the drawings (excluding FIG. 3) for the sake of convenience, and do not limit the actual arrangement or the like of each member. The "transport device" in the present invention includes a robot.

First Embodiment

A chuck apparatus 10 according to a first embodiment of the present invention will be described with reference to FIGS. 1 to 4. The chuck apparatus 10 includes a cylinder body 12 in which a piston 32 is disposed, a pair of grip members 40 capable of opening and closing, a pair of levers 42, and a base body 46. The pair of levers 42 convert the linear motion of the piston 32 into an opening/closing motion of the grip members 40. The base body 46 rotatably supports the pair of levers 42.

The cylinder body 12 having a rectangular parallelepiped shape has a cylinder hole 14 that opens at both ends thereof. A cap 26 for closing the cylinder hole 14 is press-fitted to the upper end opening portion of the cylinder hole 14 in an airtight manner. A rod cover 28 is fitted and attached to the lower end opening portion of the cylinder hole 14. The rod cover 28 includes a fitting portion 28a that is fitted into the cylinder hole 14, and a pair of guide walls 28b that extend downward from the fitting portion 28a and guide the side face of the lever 42 inside the guide walls 28b. The cylinder body 12 has a pair of mounting bolt insertion holes 16 extending from the wide first side face 12a to the wide second side face 12b.

The piston 32 includes a main body portion 32a sliding in the cylinder hole 14 and a rod portion 32b extending downward from the main body portion 32a. The rod portion 32b extends further downward through the fitting portion 28a of the rod cover 28 and is inserted between the pair of guide walls 28b. A lower end of the rod portion 32b includes an engagement pin 38 for engaging the lever shaft 44. A rod packing 30 in sliding contact with the rod portion 32b is mounted on the inner periphery of the fitting portion 28a of the rod cover 28 through a mounting groove. Thus, the lower end of the cylinder hole 14 is air-tightly held from the outside. Reference numeral 36 denotes a rubber magnet attached to the outer periphery of the main body portion 32a of the piston 32.

A first pressure chamber 18 is formed between the main body portion 32a of the piston 32 and the cap 26. A second pressure chamber 20 is formed between the main body portion 32a of the piston 32 and the rod cover 28. A piston packing 34 in sliding contact with the cylinder hole 14 is mounted on the outer periphery of the main body portion 32a of the piston 32 through a mounting groove. As a result, the first pressure chamber 18 and the second pressure chamber 20 are separated from each other in an airtight manner. A first port 22 for supplying and discharging air such as compressed air to and from the first pressure chamber 18 and a second port 24 for supplying and discharging air such as compressed air to and from the second pressure chamber 20 are opened in a third side face 12c of the cylinder body 12 having a narrow width.

The base body 46 is disposed below the cylinder body 12. The base body 46 is integrally connected to the cylinder body 12 with four connecting bolts 56 that are inserted from a lower side of the base body 46 and screwed to the cylinder body 12 (see FIG. 3). A guide wall 28b of the rod cover 28 is inserted inside the base body 46. The base body 46 has a receiving hole 48 for receiving a pair of levers 42 and a rod portion 32b of the piston 32. The base body 46 has a second side face 46b that is flush and continuous with the second side face 12b of the cylinder body 12.

A support member 50 that supports the pair of grip members 40 is disposed below the base body 46. The support member 50 is attached to the base body 46 with two guide bolts 58 that are inserted from an upper side of the base body 46 and screwed to the support member 50. The support member 50 is provided with a pair of rail grooves 52 that guides the grip members 40 so as to be movable in a direction (X direction) orthogonal to the axis of the cylinder hole 14.

Each grip member 40 has a block-shaped base portion 40a disposed between the pair of rail grooves 52 of the support member 50 and finger portions 40b extending downward from the base portion 40a. The upper surface of the base portion 40a includes engaging grooves 40c that the levers 42 engage. The finger portions 40b have screw holes 40d for screwing a connection bolt 60 to be described later.

Both side faces of the base portion 40a of each grip member 40 include grooves (not shown) facing the rail grooves 52 of the support member 50, and a plurality of balls (not shown) are held in the grooves. The plurality of balls roll between the rail grooves 52 of the support member 50 and the grooves of the base portion 40a of the grip member 40, whereby the grip member 40 can move smoothly with respect to the support member 50.

A pair of lever shafts 44 are fixed to the base body 46 by using means such as press-fitting. Each lever shaft 44 extends from the first side face 46a toward the second side face 46b and further protrudes a predetermined length from the second side face 46b. The axial line of each lever shaft 44 is perpendicular to the first side face 46a and the second side face 46b. The second side face 46b of the base body 46 and the second side face 12b of the cylinder body 12, which is flush and continuous with the second side face 46b, constitute a mounting surface attached to the transport device.

Each lever 42 is rotatably supported by each lever shaft 44 at a central portion of each lever 42. The lever 42 is formed in an L shape. The lever 42 has a first end portion 42a that is formed into a bifurcated shape by a notched groove portion and a second end portion 42b that is formed into a spherical shape. The first end portion 42a of the lever 42 engages an engagement pin 38 with which the rod portion 32b of the piston 32 is provided. The second end portion 42b of the lever 42 engages an engagement groove 40c with which the base portion 40a of the grip member 40 is provided.

According to the above structure, when the piston 32 slides in the cylinder hole 14, the pair of levers 42 rotate about the lever shaft 44, and the pair of grip members 40 move along the rail grooves 52 of the support member 50. Specifically, when air is supplied to the first pressure chamber 18 and the air in the second pressure chamber 20 is discharged, the piston 32 is driven downward. As a result, the pair of levers 42 rotate in the direction in which the distance between the second end portions 42b of the pair of levers 42 increases, and the pair of grip members 40 move in the direction the pair of grip members 40 open. When air is supplied to the second pressure chamber 20 and the air in the first pressure chamber 18 is discharged, the piston 32 is driven upward. As a result, the pair of levers 42 rotate in the direction in which the distance between the second end portions 42b of the pair of levers 42 decreases, and the pair of grip members 40 move in the direction the pair of grip members 40 close.

The cylinder body 12 has a sensor groove 62. The sensor groove 62 is a groove for mounting a position sensor (not shown) that detects the magnetic force of the magnet 36 mounted on the piston 32. A damper 64 made of an elastic material such as rubber is attached to a root portion of the rod portion 32b of the piston 32.

Figure 4:
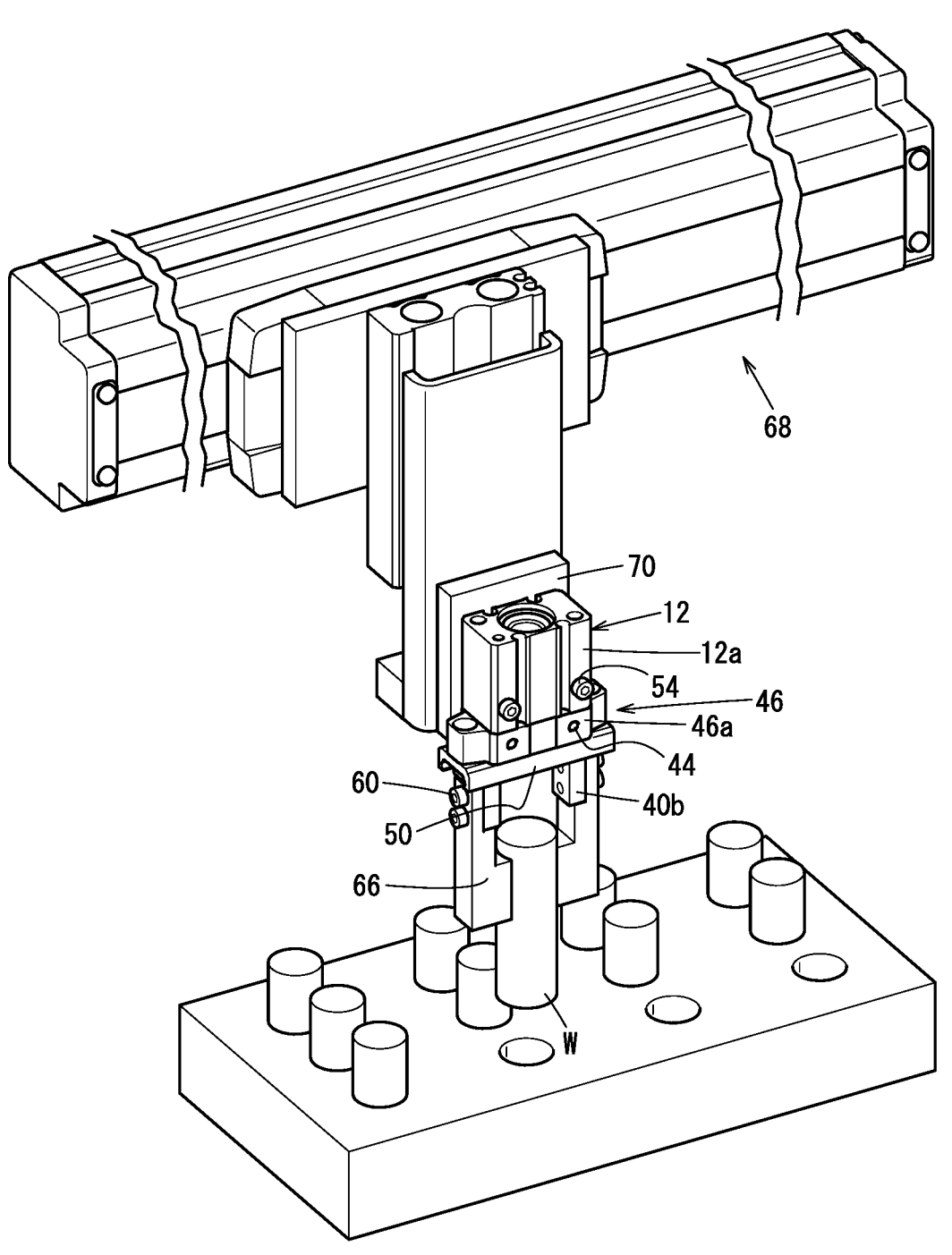
FIG. 4 is a view showing a mode in which the chuck apparatus shown in FIG. 1 is attached to a transport device for use.

Next, an example of use of the chuck apparatus 10 will be described with reference to FIG. 4. This example of use is applied to a transport device 68 that is movable along a rail suspended in a factory.

Here it is supposed that the workpiece W to be gripped by the chuck apparatus 10 has a cylindrical shape of a predetermined size. In this case, an attachment 66 suitable for gripping the workpiece W is connected to each grip member 40. Specifically, the connection bolt 60 is inserted through the insertion hole of an attachment 66 and screwed into the screw hole 40d of the finger portion 40b of the grip member 40.

The transport device 68 is configured to be capable of transporting the chuck apparatus 10 to a position above the workpiece W placed at a predetermined position. A mounting plate 70 is attached to the transport device 68. The mounting plate 70 has an outwardly facing flat surface. The mounting plate 70 has a pair of positioning holes (not shown) for receiving the lever shaft 44 of the chuck apparatus 10, and a pair of screw holes (not shown) through which the mounting bolts 54 are screwed.

In order to attach the chuck apparatus 10 to the transport device 68, the ends of the pair of lever shafts 44 protruding from the second side face 46b of the base body 46 are fitted into the positioning holes of the mounting plate 70, whereby the position of the chuck apparatus 10 is determined. Then, the two mounting bolts 54 are inserted into the mounting bolt insertion holes 16 of the cylinder body 12 and screwed into the screw holes of the mounting plate 70. At this time, the second side face 46b of the base body 46 and the second side face 12b of the cylinder body 12 that is flush and continuous with the second side face 46b overlap with the flat surface of the mounting plate 70.

In this manner, the lever shaft 44 is accurately positioned relative to mounting plate 70. It is relatively easy to conduct control quality in such a manner that a manufacturing error or an assembling error does not occur with respect to the positional relationship between the lever shaft 44 and the grip member 40. Accordingly, it is possible to increase the accuracy of the positions of the grip members 40 with respect to the transport device 68.

According to the chuck apparatus 10 of the present embodiment, the lever shaft 44 serving as the rotary axis of the lever 42 for opening and closing the grip members 40 protrudes from the second side face 46b of the base body 46 (a surface on which the body is attached to the transport device 68). Positioning with respect to the transport device 68 is performed using this projection. Therefore, the accuracy of the position of the grip members 40 relative to the transport device 68 can be increased.

Although the cylinder body 12 and the base body 46 constitute the body of the chuck apparatus 10 in this embodiment, they may be integrally formed instead of being separate members. The term "body" as used herein includes the cylinder body 12 and the base body 46.

Second Embodiment

Figure 5:
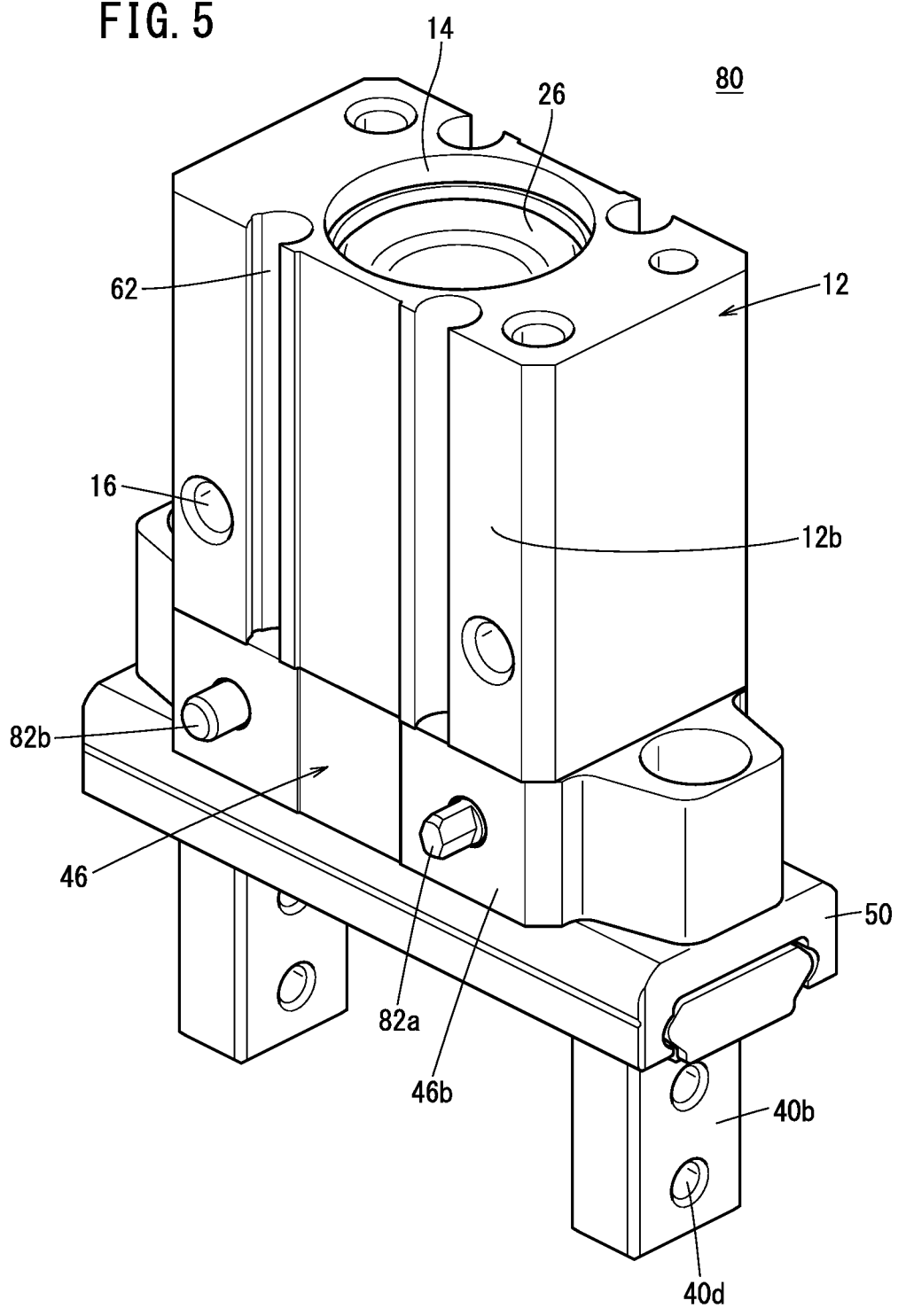
FIG. 5 is an external perspective view of a chuck apparatus according to a second embodiment of the present invention.

Next, a chuck apparatus 80 according to a second embodiment of the present invention will be described with reference to FIG. 5. The second embodiment is different from the first embodiment in the structure of the lever shaft. The same components as those of the chuck apparatus 10 described above are denoted by the same reference numerals, and detailed description thereof will be omitted.

A pair of lever shafts 82a, 82b extending from the first side face 46a toward the second side face 46b and projecting a predetermined length from the second side face 46b are attached to the base body 46. The lever shaft 82a is formed as a diamond-shaped pin of which a portion protruding from the second side face 46b is formed in a polygonal shape such as a rhombus. The lever shaft 82a is attached to the base body 46 so as to be rotatable about the axial line of the lever shaft 82a. Similar to the aforementioned lever shaft 44, the lever shaft 82b is a shaft member having a cylindrical outer peripheral surface over the entire axial length, and is fixed to the base body 46.

In order to attach the chuck apparatus 80 to the transport device 68 described above, the ends of the pair of lever shafts 82a, 82b protruding from the second side face 46b of the base body 46 are fitted into the positioning holes of the mounting plate 70 for positioning. Then, the two mounting bolts 54 are inserted into the mounting bolt insertion holes 16 of the cylinder body 12 and screwed into the screw holes of the mounting plate 70. At this time, if there is a manufacturing error in the pitch of the pair of positioning holes of the mounting plate 70, the lever shaft 82a of which a portion fitted to one of the positioning holes is formed as a diamond-shaped pin is rotated, absorbing the error, and then positioning is performed.

According to the chuck apparatus 80 of this embodiment, the pair of lever shafts 82a and 82b, which are rotational axes of the levers 42 for opening and closing the grip members 40, project from the second side face 46b of the base body 46. Positioning with respect to the transport device 68 is performed by using this projection. Therefore, the accuracy of the position of the grip members 40 relative to the transport device 68 can be increased. Further, since the end portion of one lever shaft 82a is formed as a diamond-shaped pin, high accuracy is not required for the pitch of the pair of positioning holes provided in the mounting plate 70.

In this embodiment, only one lever shaft 82a is formed as a diamond-shaped pin for a portion protruding from the second side face 46b of the base body 46, but the other lever shaft 82b may also be formed in the same manner.

Third Embodiment

Figure 6:
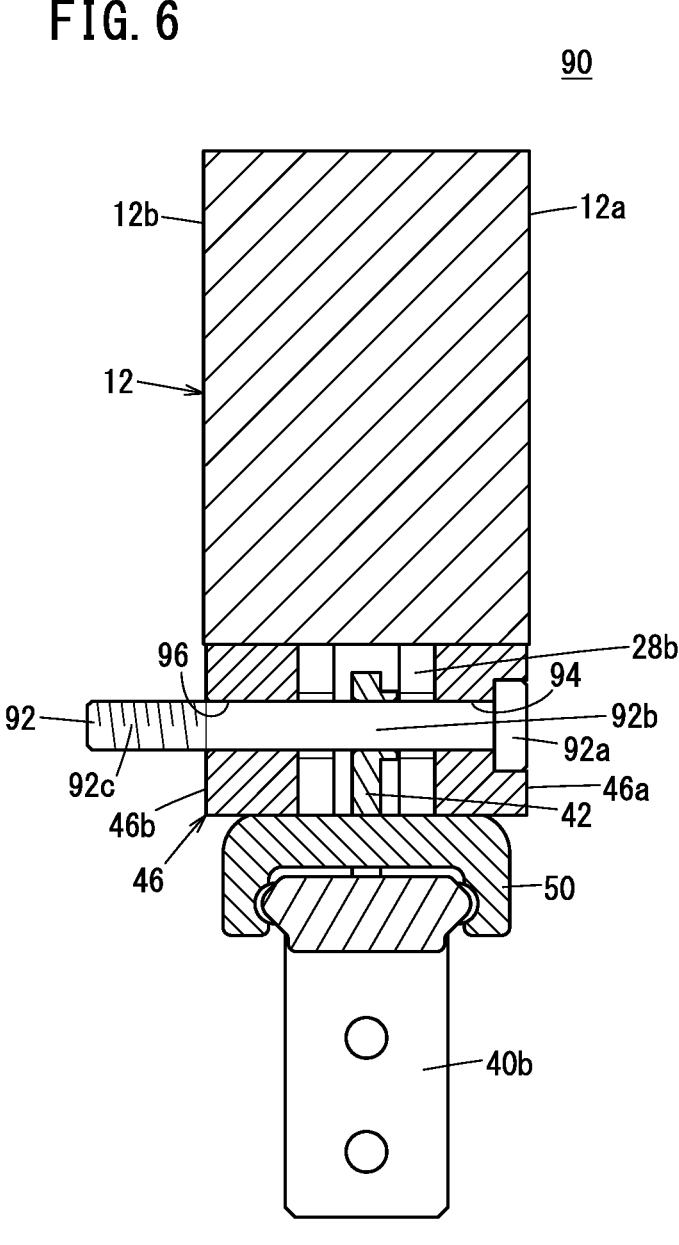
FIG. 6 is a partial cross-sectional view of a chuck apparatus according to a third embodiment of the present invention.

Next, a chuck apparatus 90 according to a third embodiment of the present invention will be described with reference to FIG. 6. The third embodiment is different from the first embodiment in that the lever shaft also serves as a mounting bolt. The same components as those of the chuck apparatus 10 are denoted by the same reference numerals, and detailed description thereof will be omitted.

The pair of lever shafts 92 of the chuck apparatus 90 is made up from reamer bolts suitable for positioning and have a head portion 92a, a shaft portion 92b, and a screw portion 92c. The lever 42 is rotatably supported around a shaft portion 92b of the lever shaft 92. The combined length of the head portion 92a and the shaft portion 92b of the lever shaft 92 is substantially equal to the distance between the first side face 46a and the second side face 46b of the base body 46.

The shaft portion 92b of the lever shaft 92 closer to the head portion 92a is fitted and supported by a first fitting hole 94 provided on the first side face 46a side of the base body 46. The shaft portion 92b of the lever shaft 92 closer to the screw portion 92c is fitted and supported by a second fitting hole 96 provided on the second side face 46b side of the base body 46. The cylinder body 12 does not have a mounting bolt insertion hole.

To attach the chuck apparatus 90 to the transport device 68 described above, a tool is inserted into the head portion 92a of the lever shaft 92. Then, the screw portion 92c of the lever shaft 92 protruding from the second side face 46b of the base body 46 is inserted and screwed into the screw hole of the aforementioned mounting plate 70.

In the chuck apparatus 90 according to the present embodiment, a pair of lever shafts 92 serving as rotational axes of the levers 42 for opening and closing the grip members 40 project from the second side face 46b of the base body 46. Positioning with respect to the transport device 68 is performed by using this projection. Therefore, the accuracy of the position of the grip members 40 relative to the transport device 68 can be increased. Further, since the lever shaft 92 formed of the reamer bolt has both functions of positioning and mounting with respect to the mounting plate 70, the number of parts of the chuck apparatus 90 is reduced.

The present invention is not limited to the embodiment described above, and various configurations may be adopted therein without deviating from the essence and gist of the invention as set forth in the appended claims.

What is claimed is:

1. A chuck apparatus for a transport device, the chuck apparatus comprising:

a body;

a piston arranged inside the body;

a lever shaft mounted to the body, wherein a portion of the lever shaft protrudes from the body such that the body may be mounted to the transport device via the lever shaft;

a rotatable lever whose rotation drives a grip member for gripping a workpiece, the lever being rotatably supported by the lever shaft and being drivable by the piston to rotate on the lever shaft, whereby the lever shaft mountable to the transport device rotatably supports the lever.

2. The chuck apparatus according to claim 1, wherein the body comprises:

a cylinder body in which the piston is disposed; and a base body that mounts the lever shaft.

3. The chuck apparatus according to claim 2, wherein:

a side face of the base body and a side face of the cylinder body are flush and continuous with one another to provide a mounting surface for the transport device.

4. The chuck apparatus according to claim 1, wherein the protruding portion of the lever shaft is formed as a diamond-shaped pin.

5. The chuck apparatus according to claim 1, wherein the lever shaft comprises a reamer bolt.

\* \* \* \* \*